Aug. 11, 1936.  T. W. MURPHY  2,050,853

VALVE

Filed April 12, 1934

WITNESSES:

INVENTOR:
Thomas W. Murphy
BY
ATTORNEY

Patented Aug. 11, 1936

2,050,853

UNITED STATES PATENT OFFICE 2,050,853

VALVE

Thomas W. Murphy, Bala-Cynwyd, Pa., assignor to Monarch Manufacturing Works, Inc., Philadelphia, Pa., a corporation of Delaware Application April 12, 1934, Serial No. 720,159

7 Claims. (Cl. 137—153)

This invention relates to a valve and more particularly to a liquid control valve having means for cushioning the movable parts upon the release of the liquid pressure.

The valve may be used, for instance, on oil burners, and will be located between the pump and the atomizing nozzle or burner and controls the flow of oil to the nozzle and also by-passes the excess liquid, thereby controlling the pressure of the liquid within the valve body and in the oil atomizing line.

Most of the present day valves of the piston type pulsate and are noisy unless some additional equipment or accessory is provided, such as collapsible tubes, diaphragms, and the like, placed in either the suction line, pressure line, or both, or the use of risers or the like in the pressure line to form a cushioning effect.

The present day piston type valves are also objectionable, especially when used in a horizontal position, as any sediment or other dirt which is deposited may be forced between the body wall and the piston, and oftentimes the piston becomes locked in its open position, thereby permitting the needle valve to remain off its seat to the burner port when the pump is shut down. This, of course, materially increases the fire hazard.

The object of the present invention is to provide a valve which will deliver oil to the atomizer comparatively free of pulsations and without noise, and also to provide a valve in which the operating parts are so arranged that all dirt or foreign matter not actually in suspension is prevented from being forced around the piston, thereby insuring an efficient operation of the piston at varying pressures.

According to the invention, the liquid control valve comprises a body having a pressure chamber and the usual inlet, burner and by-pass ports, a concentric sleeve within (although not necessarily) the body and extending into the pressure chamber forming an air-entrapment chamber closed at its one end, a piston in said sleeve depressed by a spring, said piston being controlled by the pressure of liquid acting against the predetermined tension of the spring, a by-pass passage through said piston and a double ended needle valve for opening and closing said burner port and by-pass passage through the action of said piston at predetermined pressures of the liquid in said pressure chamber, the entrapped air in said entrapment chamber acting as a cushion for the moving parts of the valve.

The drawing shows an embodiment of the invention and the views therein are as follows.

Figure 1:
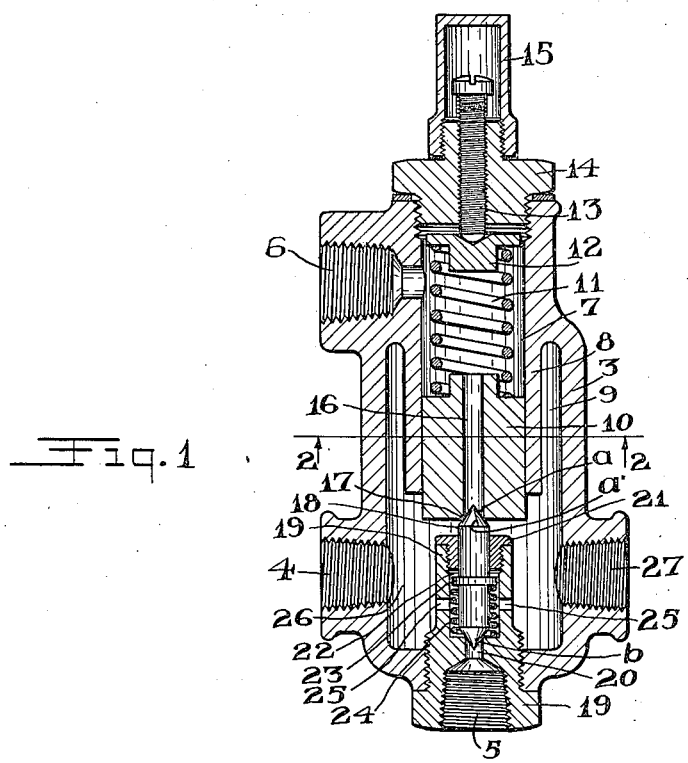
Figure 1 is a vertical sectional view of the valve.
Figure 2:
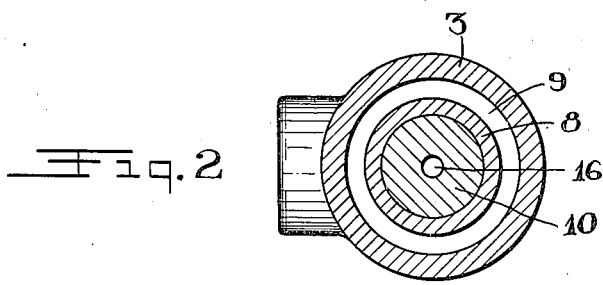
Figure 2 is a cross-sectional view of the valve on the line 22 of Figure 1.

As illustrated in the drawing, the valve casing 3 is provided with an inlet connection 4, an outlet or burner connection 5, and a by-pass connection 6. These connections are provided with the usual screw threadings to provide for the attachment of the piping; but may be flanged or even cast integral with the pump.

The upper part of the valve is provided with a bore 7 which extends through a sleeve 8 integral at its upper end with the outer wall of the valve casing. The valve casing is flared outwardly from the point where the sleeve is formed so as to provide an annular chamber 9 between the outer wall of the casing and said sleeve.

Fitting within the bore 7 is a piston 10 which is provided with a central lug for confining one end of a spiral spring 11. This spring is provided at its upper end with a nipple or pressure plate 12 against which the end of a screw 13 bears. The screw is threaded into a closure 14 which is screwed into the upper end of the casing, and the closure is provided with a cap 15 which completely encircles the screw 13 to prevent the accidental turning of the same to disarrange the adjustment of tension on the spring 11 and also to prevent any leakage of oil from the valve.

The piston 10 is provided with a central passageway 16 extending through the same, one end forming a by-pass port 17 into which fits one end a of a needle valve 18. This valve may have, not absolutely necessary because loose fit of piston serves some purpose, a slight score a', the purpose of which is hereinafter described.

The lower end of the valve body is provided with a ferrule 19 which is screw-threaded into the casing and is provided with a port 20 for receiving the other end b of the needle valve 18. This ferrule has a lock nut 21 screwed into the upper end of the same, thereby providing a chamber 22 for the operation of the valve 18.

The valve 18 has a sliding fit through the bore of the lock nut 21 and is provided with a collar 23 against which one end of a spiral spring 24 bears, while the other end of said spring rests against the lower wall of said chamber and surrounding the port 20.

The ferrule is provided with a plurality of openings 25 for establishing communication with the pressure chamber 26 of the valve. The opening 27 may be utilized for providing the valve with a pressure gauge.

The operation of the valve is as follows: Fluid under pressure is admitted through the admission port 4 to the pressure chamber 26 so as to surround the ferrule 19 and said fluid passes through the openings 25 into the chamber 22. As the fluid rises in the pressure chamber 26, the air therein is entrapped, with the exception of what small part might be forced out along the side of the piston 10 and the score $a'$, and such air passes into the annular passageway 9 where it is entrapped. Upon the increase of the fluid pressure, this air is, of course, compressed, the purpose of which is hereinafter explained. Some of the trapped air will be disposed in the chamber defined by the sleeve 8 and the wall of the body, while other air will be entrapped around the plug 19 on the other side of the opening 4.

It is, of course, understood that the screw 13 has been adjusted to give the required pressure of the spring 11 against the movable piston 10. For the sake of example, let us assume that it is desired to have the burner port open when the pressure in the pressure chamber 26 rises to 60 pounds to the square inch and the by-pass port 17 opened when the pressure in the pressure chamber rises to 100 pounds to the square inch.

When the fluid in the lower part of the valve attains 60 pounds, which is sufficient pressure to overcome the tension of the spring 11, the action of such pressure raises the piston 11 and thereupon the spring 24 will raise the valve 18 so that the end of the valve which is in the burner port 20 will be raised, thereby permitting the liquid to flow through the opening 5 while the other end of the valve in the port 17 will remain therein while the pressure continues to rise to 100 pounds to the square inch.

At this time, the collar 23 has come in contact with the bottom of the lock nut 21 and is prevented from rising further while the piston continues to move upward, thereby withdrawing the valve and opening the port 17 and permitting the fluid to flow into the passageway 16 and out through the opening 6, which may be connected to the supply tank or may be returned to the suction port of the pump between the pump and supply tank.

When the pump stops, thereby releasing the pressure of the liquid in the pressure chamber 26, the main spring 11 forces the piston 10 downward to contact the seat of by-pass port 17 with needle valve $a$ to close the by-pass port 17, and as the pressure is further relieved, the piston continues downward so as to close the port 20, thereby cutting off the supply of fluid to the burner.

It is during the operation of the valve that the compressed air in the annular entrapment chamber 9 comes into play. This compressed air forms a cushioning which is very essential to absorb to the greatest possible extent, pulsations from the pump and thereby prevent gauge vibration and noise from this cause, and also noise which might be set up by a dancing piston, either from contact with the sidewalls of the cylinder, or contact with the needle valve, and also noise caused by the spring which is set up by the rapidly fluctuating piston, all of which noises are very objectionable.

In case the valve is placed in a horizontal position, the provision of the annular chamber in the valve allows the air to be entrapped considerably above all outlets of escape, as would not be the case where the valve had a straight bore, and, therefore, the air cushioning effect is obtained whether the valve is located in a vertical or horizontal position.

In case the valve is installed in an inverted position from that shown in the drawing, that is with the burner parts disposed upwardly, a large air entrapment chamber is also formed above the ports 4, 25 and 27 within the valve body casing 3 and around the seat assembly 19. In this position the piston 10 forms a splash plate to divert any heavy dirt in to the annular pocket 9.

In valves of the straight bore type, it is almost necessary to employ the same in an upright or vertical position, because when installed horizontally, dirt and other sediment will be lodged on the bore and will be forced by the oil between the piston and the bore and thereby cause the piston to stick and often lock in open position.

With the annular entrapment chamber provided in the valve shown and described herein, a sump is provided when the valve is placed in horizontal position, so that the sediment and dirt not in suspension will be kept from the bore of the piston and thus the piston will be assured of perfect operation, at all times.

The scoring $a'$ constitutes a bleed port for relieving the pressure in the pressure chamber after the pump is shut down and the ports 17 and 20 closed, but not absolutely essential because of escapement around the piston.

While I have shown and described a particular type of valve, I do not limit myself to any precise form, but various modifications and changes in the construction and operation may be made without departing from the invention herein set forth and hereafter claimed.

The invention is hereby claimed as follows:

1. A liquid control valve comprising a body having a pressure chamber and an inlet for admitting liquid under pressure thereto, a burner port and a by-pass port, a piston sleeve in said chamber spaced from the chamber wall, a spring depressed piston operable in said sleeve and having a passageway to said by-pass port, a projecting valve seat in said chamber spaced from the chamber wall, and valve means cooperating with the valve seat to said burner port, said sleeve projecting valve seat and chamber wall providing a sediment sump remote from the movable parts at every position of the body.

2. A liquid control valve comprising a body having a pressure chamber and an inlet for admitting liquid under pressure, a burner port and a by-pass port, a sleeve in one end of the chamber and a projecting valve seat in the other end forming with the chamber wall an annulus closed at the outer ends, a spring depressed piston in the sleeve and a centrally disposed burner port in the projecting valve seat, said projecting valve seat, sleeve and piston together with the liquid entrapping air in the pressure chamber to form cushioning means at substantially every position of the body.

3. A liquid control valve comprising a body having a pressure chamber, an inlet for admitting liquid under pressure thereto, a burner and a by-pass port, a piston sleeve in said chamber spaced from the chamber wall, a spring depressed piston operable in said sleeve and having a passageway to the by-pass port, a projecting valve seat in the other end of the valve chamber spaced from the chamber wall, valve means co-operating with the valve seat to burner port, said sleeve, piston and projecting valve seat providing means in conjunction with the liquid under pressure to entrap air in the pressure chamber to form cushioning means at substantially every position of the body, and to provide a sediment sump remote from the movable parts and outlet ports at every position of the body.

4. A liquid control valve comprising a body having a pressure chamber and inlet, burner and by-pass ports, a concentric sleeve in said body integral at one end with the same and extending into the pressure chamber forming with the body walls an air entrapment chamber closed at one end, a centrally bored spring depressed piston having a sliding fit in said sleeve and extending therethrough and controlled by the pressure of liquid, and a member having a valve at each end for opening and closing said burner and by-pass ports respectively through the action of said piston at predetermined pressures of the liquid in said pressure chamber.

5. A liquid control valve comprising a body having a pressure chamber and inlet, burner and by-pass ports, a cylinder in said body, a spring depressed piston having a sliding fit in said cylinder, a member having a valve at each end for opening and closing said burner and by-pass ports respectively through the action of said piston at predetermined pressures of the liquid in said pressure chamber, and an annular chamber around the cylinder formed by and closed at one end by the body walls for entrapping the air in said annular chamber and forming a cushion for the piston and valve to prevent chattering.

6. A liquid control valve comprising a housing having an inlet port, a by-pass port and pressure line port and providing pressure chambers characterized by concentric sleeves protruding within opposite ends of the pressure chamber and forming air entrapment cushioning chambers, a spring depressed sliding member within the sleeve having a conduit leading from the pressure chamber to the by-pass port and a double ended needle valve normally having one end closing said conduit and the other end closing the pressure line port.

7. A liquid control valve comprising a body having a pressure line inlet, burner and by-pass outlets, characterized by concentric sleeves protruding from opposite ends within the chamber one integral at one end with said body and forming vibration reducing air entrapment chambers each closed at one end and open at the other into the pressure chamber, a spring depressed piston in said sleeve adapted to be controlled by liquid pressure within the chamber and having a conduit therethrough and a member having a valve at each end for closing the burner outlet and the by-pass outlet respectively.

THOMAS W. MURPHY.